United States Patent [19]

Tomii et al.

[11] Patent Number: 4,736,139
[45] Date of Patent: Apr. 5, 1988

[54] FLAT TYPE CATHODE RAY TUBE AND COLOR IMAGE DISPLAY APPARATUS UTILIZING SAME

[75] Inventors: Kaoru Tomii, Isehara; Hiroshi Miyama, Yokohama; Yoshikazu Kawauchi, Kawasaki; Jun Nishida, Tokyo, all of Japan

[73] Assignee: Matsushita Electric Industrial Co., Ltd., Osaka, Japan

[21] Appl. No.: 798,335

[22] Filed: Nov. 15, 1985

[30] Foreign Application Priority Data

| Nov. 19, 1984 [JP] | Japan | 59-243721 |
| Jan. 23, 1985 [JP] | Japan | 60-10069 |
| Mar. 5, 1985 [JP] | Japan | 60-43139 |
| Sep. 5, 1985 [JP] | Japan | 60-196286 |

[51] Int. Cl.$^4$ .................... H01J 29/70; H01J 29/72
[52] U.S. Cl. .................................. 315/366; 313/422
[58] Field of Search .................. 315/366; 313/422; 358/69, 67

[56] References Cited

U.S. PATENT DOCUMENTS

| 3,939,486 | 2/1976 | Tomii | 358/67 |
| 4,118,651 | 10/1978 | Scott | 313/422 |
| 4,129,804 | 12/1978 | Wiesbrod | 315/366 |
| 4,174,523 | 11/1979 | Marlowe et al. | 358/67 |
| 4,259,687 | 5/1981 | Shinkai et al. | 358/69 |
| 4,356,427 | 10/1982 | Noguchi et al. | 313/422 |
| 4,435,672 | 5/1984 | Heynisch | 315/366 |
| 4,523,225 | 6/1985 | Masuda et al. | 313/422 |
| 4,551,653 | 11/1985 | Hilsum | 358/69 |

Primary Examiner—Theodore M. Blum
Attorney, Agent, or Firm—Stevens, Davis, Miller & Mosher

[57] ABSTRACT

A flat type cathode ray tube comprises, in a vacuum enclosure, a plurality of vertically extending line cathodes, as many vertical scan electrodes as 1/n (n≧2) of the number of horizontal scan lines arranged behind the line cathodes perpendicularly to the line cathodes, and modulation electrodes, planar grid electrodes, vertical deflection electrodes, horizontal deflection electrodes and a phosphor screen all of which are arranged sequentially in front of the line cathodes. The modulation electrodes are separated into a plurality of planar sections which are arranged in one-to-one correspondence with the respective line cathodes. The vertical deflection electrodes include two planar electrodes having respective electron beam passing openings provided therein which are shifted from each other. The horizontal deflection electrodes are divided into a plurality of sections in the direction of the electron beam paths.

In a color display tube having a phosphor screen in which three primary color phosphors are arranged sequentially and repeatedly with black areas intervening therebetween, the timings for the electron beams to scan predetermined positions on the phosphor screen are stored, and a color video signal to be applied to the color display tube is controlled to make the electron beams correspond to the respective proper positions on the phosphor screen based on the stored timings, thereby compensating for a deviation occurring in the horizontal landing positions of the electron beams.

14 Claims, 18 Drawing Sheets

FLAT TYPE CATHODE RAY TUBE AND COLOR IMAGE DISPLAY APPARATUS UTILIZING SAME

BACKGROUND OF THE INVENTION

1. Field of the Invention

The present invention relates to a flat type cathode ray tube for a color television receiver set or a computer terminal display, and a color image display apparatus utilizing the same.

2. Description of the Prior Art

U.S. patent application Ser. No. 748,833 by the assignee of the present application discloses a flat type cathode ray tube shown in FIG. 1. In the actual structure, electrodes are contained in a vacuum enclosure (glass vessel), however, the vacuum enclosure has been excluded in FIG. 1 to clearly show the internal electrodes. A horizontal axis H and a vertical axis V are shown on a faceplate to define horizontal and vertical directions of a display screen on which an image or characters is displayed.

A plurality of line cathodes 10 which extend vertically and are made of tangusten wires with an oxide formed on the surfaces thereof are arranged horizontally and independently at equal spatial intervals. The number of the line cathodes 10 and the spacing thereof are arbitrary. Assuming that the display screen size is 10 inches, the horizontal spacing is approximately 10 mm, and twenty line cathodes having a vertical length of approximately 160 mm are arranged. Vertical scan electrodes 12, which are electrically separated from each other and extend horizontally, are arranged at constant vertical spatial intervals on an insulating support 11 which are disposed closely to the line cathodes 10 and on one side of the line cathodes 10 opposite to the other side thereof facing a faceplate 9. If a conventional television image is to be displayed, the vertical scan electrodes 12 have the same number of independent electrodes as the number of horizontal scan lines (about 480 lines for the NTSC system). A first grid electrode (G1) 13 comprising planar electrodes, each of which has openings at positions corresponding to each one of the line cathodes 10 and which are separated in correspondence with the respective line cathodes 10, for effecting the beam-modulation by applying video signals to the individual planar electrodes, a second grid electrode (G2) 14 and a third grid electrode (G3) 15, which have similar openings to those of the electrode (G1) 13 but are not separated electrically and horizontally, are arranged sequentially between the line cathodes 10 and the faceplate 9 in the direction from the line cathodes 10 to the faceplate 9. Then, a fourth grid electrode (G4) 16 having the same openings or horizontally broader openings as compared with the openings of the electrodes (G2) 14 and (G3) 15 is arranged. Next, horizontal focusing electrodes 17 and horizontal deflection electrodes 18, both of which are formed on a surface of an insulating support 19 by the plating or vapor-depositing process, are arranged symmetrically with respect to the electron beam paths at the same horizontal intervals as that of the line cathodes 10. A light emitting layer comprising a phosphor screen 7 and a metal back electrode 8 is formed on an inner surface of the faceplate 9. In a color display apparatus, the phosphor screen 7 is formed by arranging red (R), green (G) and blue (B) phosphors horizontally and sequentially in stripes or dots.

Referring to FIGS. 2 and 3A and 3B, the operation of the above-mentioned color cathode ray tube is explained. The line cathodes 10 are heated by causing electric currents to flow therethrough. Voltages substantially equal to the voltage of the line cathodes 10 are applied to the electrode (G1) 13 and the vertical scan electrodes 12. A voltage (100-300 volts) higher than the electric potential of the cathodes 10 is applied to the electrode (G2) 14 so that beams are directed from the cathodes 10 to the electrodes (G1) 13 and (G2) 14 and pass through the openings of the respective electrodes. In order to control the quantity of the electron beams passing through the openings of the electrodes G1 and G2, the voltage of the electrode (G1) 13 is varied. The electron beams which have passed through the openings of the electrode (G2) 14 further pass through the electrode (G3) 15, electrode (G4) 16 and horizontal focusing electrode 17. Predetermined voltages are applied to those electrodes so that the electron beams are focused to a small spot on the phosphor plane. The vertical electron beam focusing is carried out by an electrostatic lens formed at an exit of the openings of the electrode (G4) 16, and the horizontal electron beam focusing is carried out by an electrostatic lens formed between the horizontal focusing electrode 17 and the horizontal deflection electrode 18. The electron beam which passed through the horizontal focusing electrode 17 is horizontally deflected by a predetermined width due to a step deflection voltage or a sawtooth wave of a horizontal scan period applied to the horizontal deflection electrode 18, and it stimulates the phosphor 7 to produce a light image. In order to produce a color image, a modulation signal for a color corresponding to the color phosphor to which the electron beam is directed is applied to the electrode (G1) 13.

The vertical scan is explained with reference to FIGS. 3A and 3B. The generation of electrons from the line cathodes 10 is controlled by controlling the voltage of the vertical scan electrode 12 in a way such that the electrostatic field around the line cathodes 10 is made positive or negative with respect to the electric potential of the line cathodes 10. If the distance between the line cathodes 10 and the vertical scan electrodes 12 is small, a voltage for controlling ON or OFF of electron beams from the cathodes 10 may be low. When an interlaced system is adopted, in a first field, a signal is applied to a vertical scan electrode 12A to generate (ON) an electron beam only for one horizontal scan period (1H), and for the next 1H period, a signal is applied to a vertical scan electrode 12C to generate (ON) an electron beam, and then in a similar manner, signals to generate electron beams only for the 1H period are sequentially applied to every other vertical scan electrode. When a signal is applied to the bottom electrode 12X, the vertical scan of the first one field is completed. In the second field, a signal for generating an electron beam only for the 1H period is sequentially applied starting from the electrode 12B to the final electrode 12Y, whereby the vertical scan of one frame is completed.

With this arrangement, however, it is difficult to maintain a precise electron beam spot size and a precise electron beam incident position on the phosphor screen for the respective beams in the whole electron beam teansmission range from electron guns to the phosphor plane, and the deflection sensitivity is low.

Further, it is necessary that the number of the vertical scan electrodes, which are arranged behind the line cathodes, corresponding to the number of horizontal scan lines is approximately 480 for the conventional television system, or one half thereof, that is, 240 for a system in which the beam positions are vertically shifted in the interlaced operation. It is desirable to make the number of the vertical scan electrodes as small as possible in view of not only the manufacture of the electrodes but also the connection of the vertical scan electrodes with the drive circuits and the number of the drive circuits.

Besides, in order for a color image to be exactly displayed on the above-mentioned flat type cathode ray tube, a modulation signal for a color corresponding to the color phosphor to which the electron beam is directed should be applied to the eleotrode G1. However, since this cathode ray tube has no such function, if the horizontal deflection width varies or the linearity of the horizontal deflection is insufficient, the hue of the color image varies. Further, if the spatial interval of the horizontal deflection electrodes becomes nonuniform in the manufacture of the cathode ray tube, the hue of the color image also varies at every horizontal block.

SUMMARY OF THE INVENTION

It is an object of the present invention to provide a flat type cathode ray tube which is simple in the structure and easy in the electron beam control, is uniform in the size of the electron beam spot and in the electron beam landing characteristic thereof, and has the high deflection sensitivity.

It is another object of the present invention to reduce the number of vertical scan electrodes.

It is still another object of the present invention to provide a color image display apparatus which is free from hue nonuniformity caused by the nonuniform horizontal electron beam landing and which can display a color image with high fidelity.

In accordance with the present invention, there is provided a flat type cathode ray tube comprising separated vertical scan electrodes for vertically scanning electron beams, a plurality of line cathodes extending vertically and arranged horizontally and in parallel with each other at a predetermined pitch, modulation electrodes arranged in one-to-one correspondence with the respective line cathodes, each thereof having openings disposed at positions corresponding to the separated vertical scan electrodes, three planar electrodes each thereof having openings disposed at positions corresponding to the openings of the modulation electrodes, two vertical deflection electrodes having openings vertically shifted from each other therebetween, horizontal deflection electrodes divided into three and arranged corresponding to mid-positions of the line cathodes and in the direction of the eleotron beam transmission, and a faceplate having a phosphor plate.

The number of the divided vertical scan electrodes is 1/n (n is an integer not smaller than two) of the number of the horizontal scan lines.

The landing positions on the phosphor screen of the electron beams emitted from the line cathodes are detected and stored, and a video signal applied to the electrode G1 is switched in accordance with the stored electron beam landing position signals so that the color signal corresponding to the color phosphor to which the electron beam is directed is applied to the electrode G1.

In another embodiment of the present invention, a flat type color cathode ray tube has an index area functioning as a reference signal generator arranged outside of a color image display area. The timings of scanning the respective color phosphors by the electron beams for scanning the color image display area are detected beforehand with relation to the reference signal produced from the index area, and the timings are stored. Then, in the actual display operation, the stored signals are read out based on the reference signal to be used as the color signal switching control signals which are applied to the electrode G1.

DESCRIPTION OF THE PREFERRED EMBODIMENTS

Figure 4:
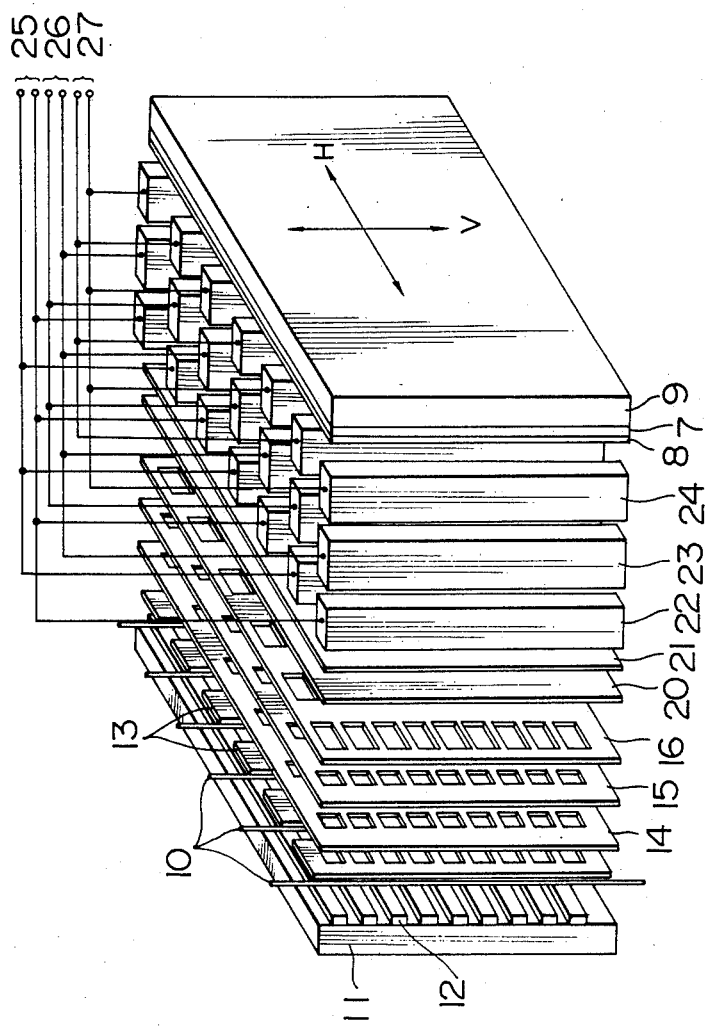
FIG. 4 is a perspective view showing the structure of a first embodiment of the flat type cathode ray tube of the present invention.
Figure 5:
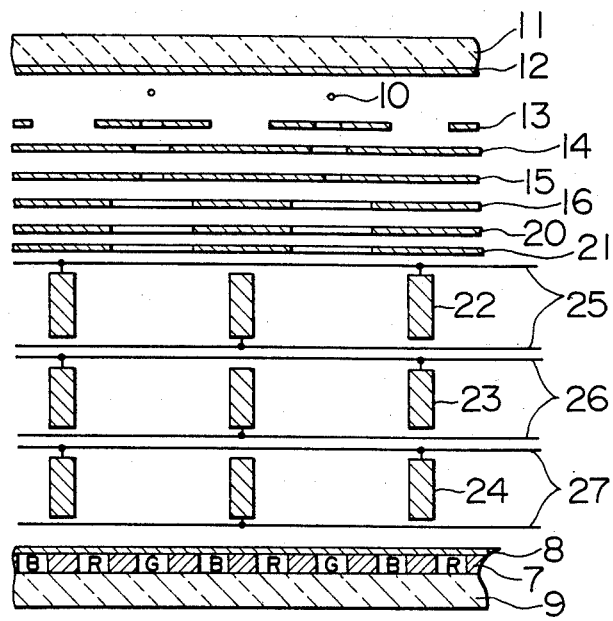
FIG. 5 is a horizontal sectional view of the cathode ray tube shown in FIG. 4.
Figure 6:
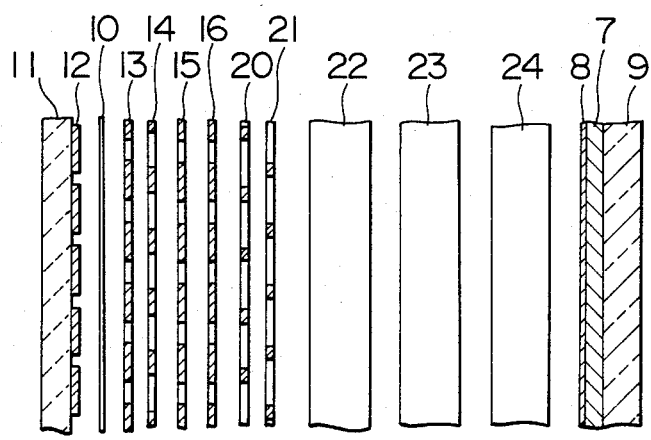
FIG. 6 is a vertical sectional view of the cathode ray tube shown in FIG. 4.

FIGS. 4 to 6 show a first embodiment of the flat type cathode ray tube of the present invention.

Figure 1:
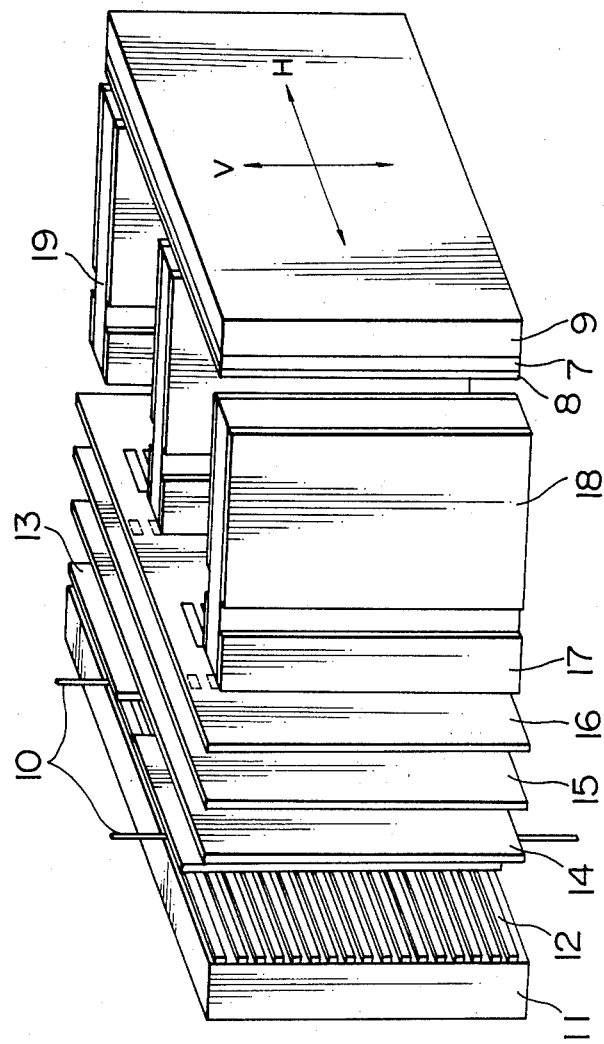
FIG. 1 is a perspective view showing the structure of a prior art flat type cathode ray tube.
Figure 2:
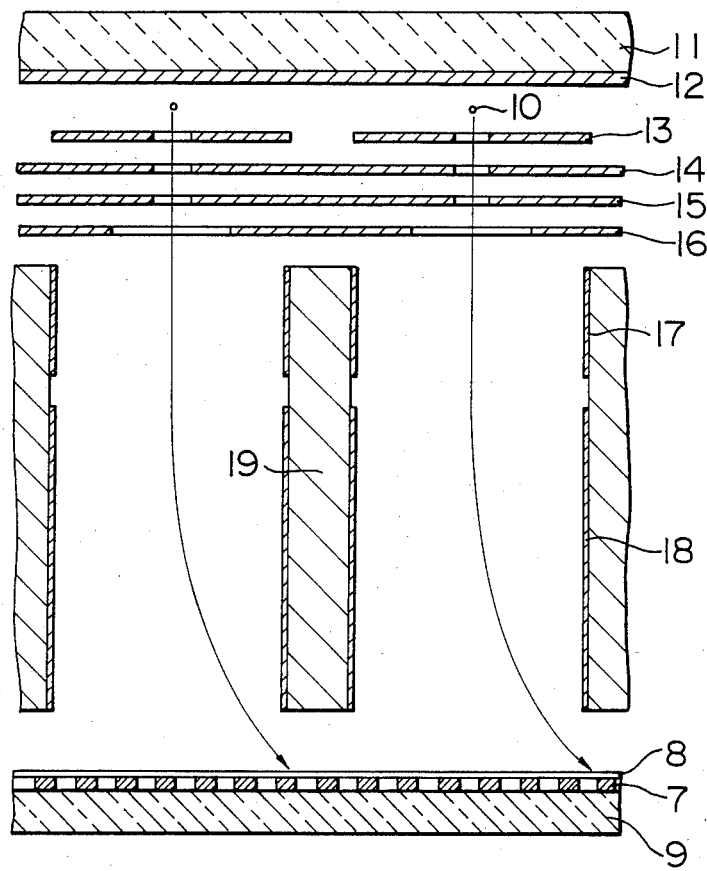
FIG. 2 is a horizontal sectional view of the cathode ray tube shown in FIG. 1.
Figure 3A:
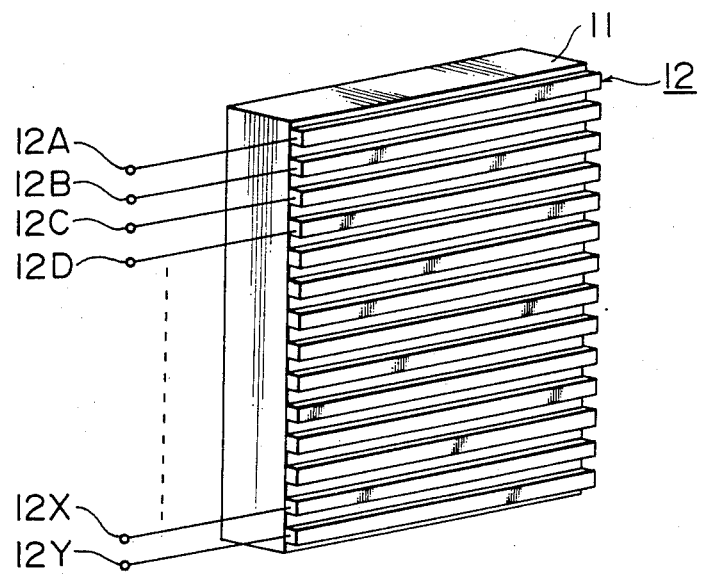
FIGS. 3A and 3B illustrate the vertical scan operation.
Figure 3B:
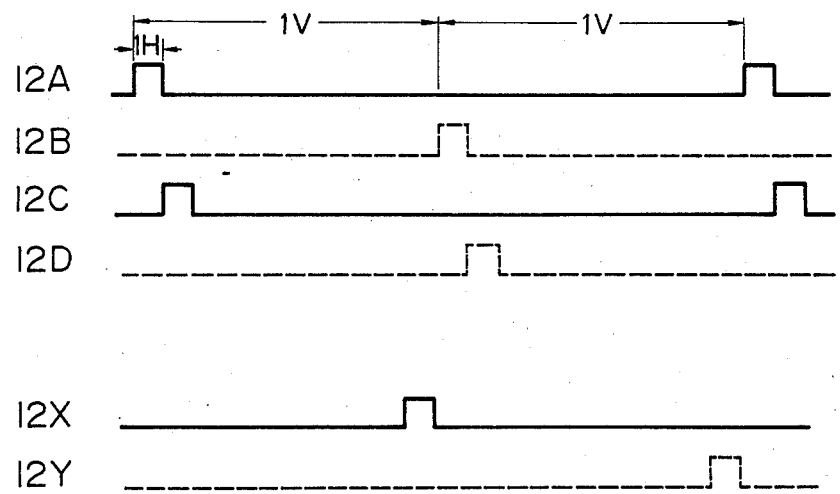

FIG. 4 is a perspective view, FIG. 5 is a horizontal sectional view and FIG. 6 is a vertical sectional view. The same or like elements as those shown in FIGS. 1 and 2 are designated by the same numerals or symbols. Actually, the electrodes are contained in a vacuum enclosure (glass vessel), although the vacuum enclosure has been omitted to clearly show the internal arrangement of the electrodes. In order to define the horizontal and vertical directions of a screen on which an image or characters are displayed, a horizontal axis (H) and a vertical axis (V) are shown on a faceplate. Numeral 10 denotes line cathodes which are made of tangusten wires coated with oxide cathode materials and extend in the V direction and are horizontally spaced from each other at regular spatial intervals. Horizontally extending vertical scan electrodes 12 are arranged at a constant vertical pitch and electrically separated on an insulative support 11 disposed closely to the line cathodes 10 on the side of the line cathodes 10 opposite to the side thereof facing a faceplate 9. When a conventional television image is displayed, the number of the vertical scan electrodes 12 is one half of the number of the horizontal scan lines (480 lines for the NTSC system). Sequentially arranged between the vertical scan electrodes 12 and the faceplate 9 in the direction from the vertical scan electrodes 12 to the faceplate 9 are the line cathodes 10, first grid electrodes (G1) 13 comprising planar electrodes each of which has openings at positions corresponding to the respective vertical scan electrodes 12 and which are separated horizontally in correspondence with the respective line cathodes 10 for effecting the beam-modulation by applying video signals to the individual planar electrodes, and a second gride electrode (G2) 14 and a third grid electrode (G3) 15 having the same openings as those of the electrodes (G1) 13 but which are not horizontally separated. The electrode (G2) 14 functions to generate electron beams from the line cathodes 10, and the electrode (G3) 15 functions to shield an electron beam generating electric field from an electric field generated by the suceeding stage electrodes. Then, a fourth grid electrode (G4) 16 having openings, each of which is greater horizontally than vertically and which are disposed at positions corresponding to the line cathodes 10, is arranged. Two electrodes 20 and 21 having openings, each of which is greater horizontally than vertically like the openings of the electrode (G4) 16, are arranged behind the electrode (G4) 16. As shown in FIG. 6, the center axes of the openings of the electrodes 20 and 21 are vertically shifted from each other thereby to form vertical deflection electrodes. A plurality of stages of vertically elongated electrodes are arranged behind the vertical deflection electrodes 20 and 21, at positions corresponding to mid-positions of the line cathodes 10 and in the direction of the faceplate 9. FIGS. 4 to 6 show, as an example, three stages of such electrodes. The respective electrodes are designated as first horizontal deflection electrodes (DH-1) 22, second horizontal deflection electrodes (DH-2) 23, and third horizontal deflection electrodes (DH-3) 24. Every other horizontally arranged electrodes of each of the horizontal deflection electrodes 22, 23 and 24 are connected to the respective common buses 25, 26 and 27. The same voltage as a D.C. voltage applied to a metal back electrode 8 of the faceplate 9 is applied to the electrode (DH-3) 24, and voltages for horizontally focusing the electron beams are applied to the electrodes (DH-1) 22 and (DH-2) 23. A light emitting layer comprising a phosphor screen 7 and the metal back electrode 8 is formed on an inner surface of the faceplate 9. In a color display apparatus, the phosphor screen 7 has phosphor stripes of red (R), green (G) and blue (B) arranged sequentially in the horizontal direction, with black guard bands intervening therebetween.

The operation of the above-described color cathode ray tube is explained. Electric currents are supplied to the line cathodes 10 to heat them. A substantially same voltage as the electric potential of the line cathodes 10 is applied to the electrodes (G1) 13 and the vertical scan electrodes 12. A voltage (e.g. 100–300 volts), which is higher than the potential of the cathodes 10, is applied to the electrode (G2) 14 so that the electron beams emitted from the cathodes 10 are directed to the electrodes (G1) 13 and (G2) 14 and they pass through the openings of the respective electrodes. The control of the quantity of the electron beams passing through the openings of the electrodes (G1) 13 and (G2) 14 is effected by varying the voltage of the electrode (G1) 13. The electron beam, which passed through the opening of the electrode (G2) 14, proceeds further to pass sequentially through the electrode (G3) 15, electrode (G4) 16, vertical deflection electrodes 20 and 21 and horizontal deflection electrodes 22, 23 and 24. Voltages of a predetermined magnitude are applied to those electrodes so that the electron beams are focused into a small spot on the phosphor screen 7. The vertical beam focusing is effected by electrostatic lenses formed between the electrode (G3) 15, electrode (G4) 16 and vertical deflection electrodes 20 and 21, and the horizontal beam focusing is effected by electrostatic lenses formed bewteen the electrodes (DH-1) 22, (DH-2) 23 and (DH-3) 24. The two sets of electrostatic lenses are formed only vertically and horizontally, respectively, so that the vertical and horizontal adjustments of the spot size of the electron beams can be performed independently.

The buses 25, 26 and 27 to which the electrodes (DH-1) 22, (DH-2) 23 and (DH-3) 24 are connected, respectively, are supplied with sawtooth wave, trianglar wave or step form deflection voltages of the same magnitude and horizontal scan period, so that the electron beams are deflected horizontally by a predetermined width to scan the phosphor screen 7 by the electron beams and thereby to produce a color image.

Figure 7A:
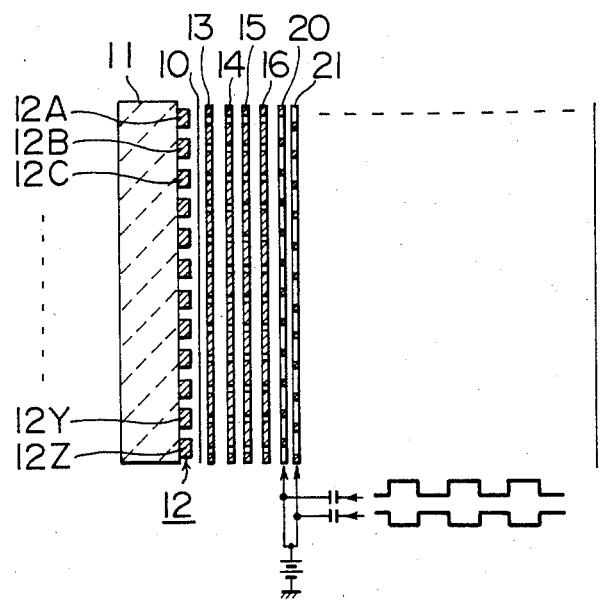
FIGS. 7A and 7B are respectively a sectional view and a waveform diagram for illustrating the vertical scanning operation of the flat type cathode ray tube of the present invention.
Figure 7B:
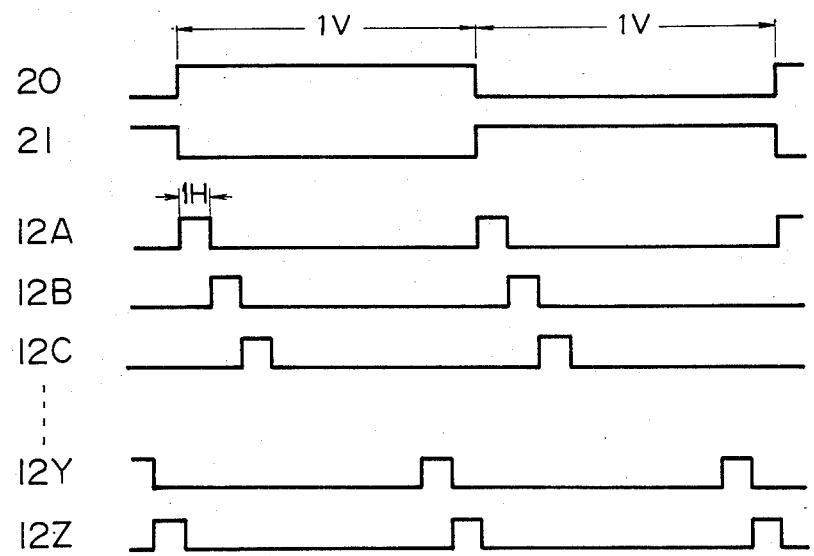

The vertical scanning operation is explained with reference to FIGS. 7A and 7B. FIG. 7A shows the structure of the respective electrodes, and FIG. 7B shows waveforms of the voltages applied to the respective electrodes in FIG. 7A. As described above, by controlling the voltage of the vertical scan electrodes 12 so that the electric potential of the space surrounding the line cathodes 10 is positive or negative with respect to the electric potential of the line cathodes 10, the generation of electrons from the line cathodes 10 is controlled. If the distance between the line cathodes 10 and the vertical scan electrodes 12 is short, a small voltage may be used to control the generation (ON) and cutoff (OFF) of the eleotron beams from the line cathodes 10. In the current television system adopting the interlaoed system, predetermined deflection voltages are applied to the vertical deflection electrodes 20 and 21 for one field period in the vertical scanning of a first field, a voltage to generate (ON) the electron beams is applied to the vertical scan electrode 12A only for one horizontal scan (1H) period, but voltages to cut off (OFF) the electron beams are applied to the other vertical scan electrodes 12B to 12Z. After the 1H period has elapsed, an ON voltage is applied only to the vertical scan electrode 12B for one 1H period, and then an ON voltage is sequentially applied to the respective vertical scan electrodes 12C, 12D, ..., only for one 1H period. When an ON voltage is applied to the bottom electrode 12Z, the vertical scanning of the first field is completed. In the vertical scanning of a second field, the polarity of the deflection voltages applied to the vertical deflection electrodes 20 and 21 are reversed and the application of the reversed voltages is continued for one field period, and the application of signal voltages to the vertical scan electrodes 12 is performed similarly to that in the vertical scanning of the first field. The amplitude of the deflection voltages applied to the vertical deflection electrodes 20 and 21 are adjusted so that the horizontal scan lines in the second field fall between the horizontal scan lines in the first field. In this manner, the same vertical scan signal voltages are applied to the vertical scan electrodes 12 in both of the first and second fields, but the deflection voltages applied to the vertical deflection electrodes 20 and 21 are changed between the first field and the second field, whereby the vertical scanning of one frame is completed.

Figure 8:
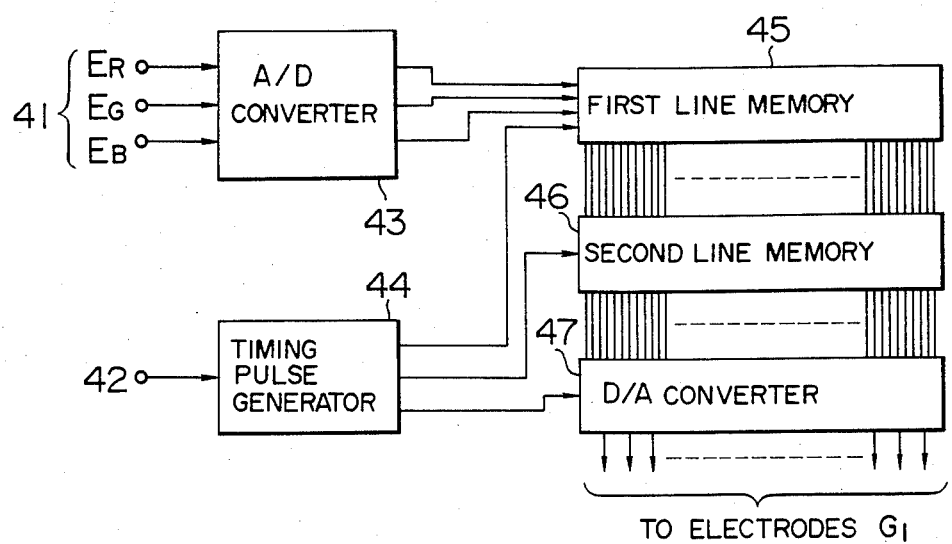
FIG. 8 is a block diagram showing a drive circuit for the flat type cathode ray tube of the present invention.

Next, a signal processing system for applying a video signal to electron beam modulation electrodes of a cathode ray tube having a plurality of beam producing sources arranged horizontally such as the above-described flat type cathode ray tube is explained with reference to FIG. 8.

Timing pulses for driving a circuit block, which is described later, are generated by a timing pulse generator 44 based on a television synchronization signal 42 applied thereto. The demodulated three primary color signals ($E_R$, $E_G$, $E_B$) 41 corresponding to the colors R, G and B are converted to digital signals through an A/D converter 43 and the signals in one 1H period are supplied to a first line memory 45 upon initiation by one of the timing pulses. When all of the signals in the one 1H period have been supplied to the first line memory 45, the signals are simultaneously transferred to a second line memory 46 and the signals in a next 1H period are supplied to the first line memory 45. The signals transferred to the second line memory 46 are stored for one 1H period, and then the signals are transferred to a D/A converter (or a pulse width modulator) 47, in which the signals are reconverted to the previous analog signals (or pulse width modulated signals). Then, the reconverted signals are amplified and applied to the modulation electrodes G1 of the cathode ray tube. The line memories 45 and 46 are used for the time axis conversion in this case.

In the above embodiment, the order of arrangement of the electrode (G4) 16 and the vertical deflection electrodes 20 and 21 may be reversed. Further, the number of the vertical scan electrodes 12 may be made 1/n (where n is an integer not smaller than two) of the number of the horizontal scan lines and the vertical scan electrodes 12 may be switched at every time interval of nH. In addition, n step deflection voltages may be applied to the vertical deflection electrodes 20 and 21.

With the structure of the above embodiment, it is possible to obtain a flat type cathode ray tube which is free from variations in the spot size and the landing characteristic of the electron beams and has high deflection sensitivity still by means of the simple structure and electrode voltage control.

Figure 9:
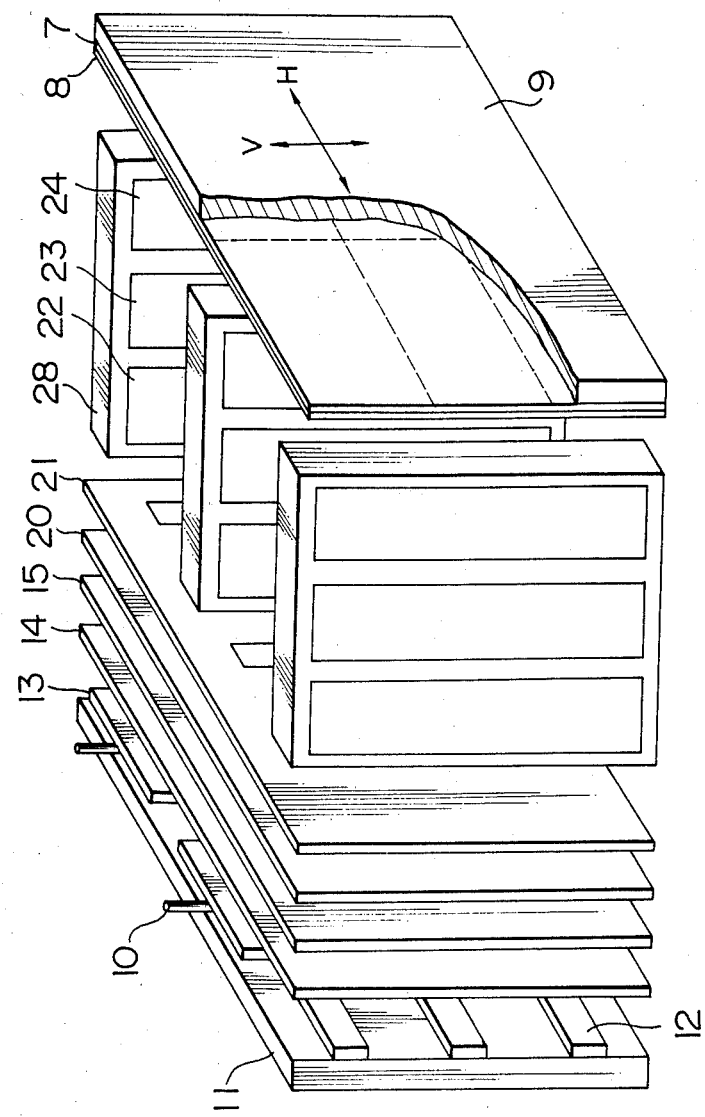
FIG. 9 is a structural diagram showing the structure of a second embodiment of the flat type cathode ray tube of the present invention.

FIG. 9 shows an arrangement of the electrodes in a vacuum enclosure of a flat type cathode ray tube of a second embodiment of the present invention. The same or like elements as those shown in FIG. 4 are designated by the same numerals or symbols. Numeral 12 designates vertical scan electrodes disposed on an insulating support 11 which forms a part of the vacuum enclosure, numeral 10 designates line cathodes, numeral 13 designates first modulation grid electrodes (G1), numeral 14 designates a second grid electrode (G2) for extracting electrons, numeral 15 designates a third grid electrode (G3) for exercising a focusing effect upon electron beams, numerals 20 and 21 designate deflection electrodes ($D_{V1}$, $D_{V2}$) for focusing and vertically deflecting electron beams, numerals 22, 23 and 24 designates horizontal deflection electrodes ($D_{H1}$, $D_{H2}$, $D_{H3}$), respectively, disposed on an insulating support 28 for effecting horizontal focusing and horizontal deflecting of electron beams, and numeral 9 designates a faceplate which is a part of the vacuum enclosure and has a phosphor 7 and a metal back layer 8 formed on an inner surface on the side of vacuum space in the vacuum enclosure.

The construction and operation of this embodiment are now explained.

Referring to FIG. 9, in the actual structure of the flat type cathode ray tube of the present invention, it encloses respective electrodes thereof in the vacuum enclosure (made of a glass, metal, etc.). However, the vacuum enclosure has been removed except a portion thereof so as to show clearly the internal electrodes. A horizontal axis (H) and a vertical axis (V) are shown on the faceplate 9 in order to define horizontal and vertical directions of the display screen on which an image or characters are displayed.

The line cathodes 10 made of metal wires such as tangusten wires, etc. having oxide cathodes formed on the surfaces thereof are arranged extending vertically and at predetermined horizontal spatial intervals, being extended with springs or the like. Horizontally extending vertical scan electrodes 12 are arranged, at constant vertical spatial intervals and electrically separated from each other, on the insulating support 11 (which may be a part of the vacuum enclosure) and closely to the line cathodes 10 on the side of the line cathodes 10 opposite to the side thereof facing the faceplate 9. When displaying a conventional television image, the number of the vertical scan electrodes 12 is selected to be equal to 1/n (where $n \geq 3$) of the number of the horizontal scan lines. In manufacturing the vertical scan electrodes 12, electrically conductive materials such as thin metal films, transparent conductive films, etc. may be formed on a surface of a glass substrate, etc. by the vacuum deposition, photoetching, or the like process. Alternatively, a metal plate may be divided by photoetching and fixed partially onto the substrate by using an insulating material (for example, a frit glass). The electrodes (G1) 13 each thereof having electron beam passing openings disposed at portions thereof opposite to the line cathodes 10 and also opposite to the vertical scan electrodes 12 are arranged between the line cathodes 10 and the faceplate 9, being horizontally divided and electrically separated from each other to correspond to the line cathodes 10 which are arranged in the horizontal direction and are electrically separated from each other.

Figure 10:
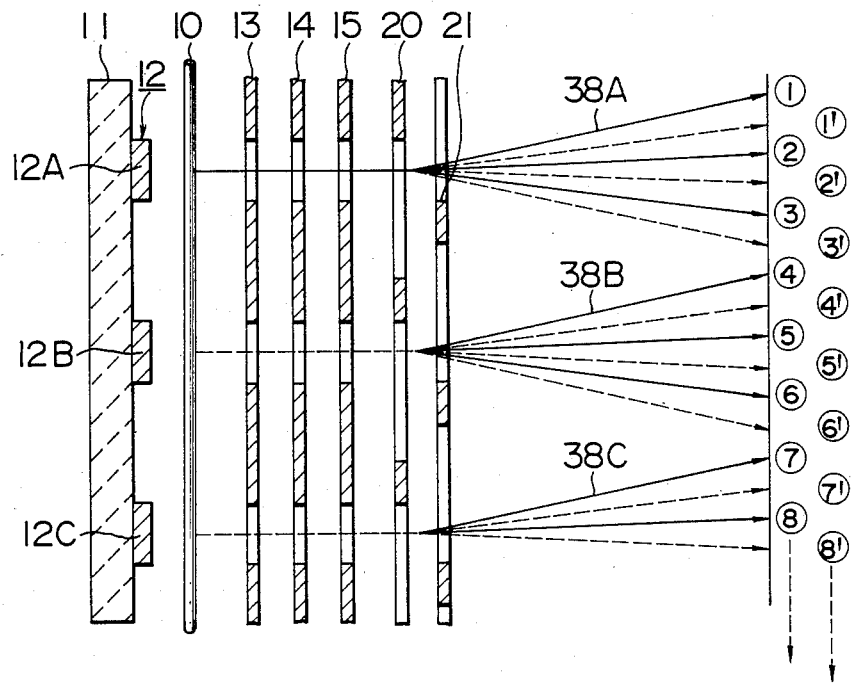
FIG. 10 is a structural diagram showing the electrode structure and illustrating the state of transmission of electron beams in the flat type cathode ray tube shown in FIG. 9.

Next, the planar electrode (G2) 14, which has similar electron beam passing openings to those of the electrodes (G1) 13 but is not divided, is arranged, and the electrode (G3) 15 having similar electron beam passing openings to those of the electrode (G2) 14 is arranged, and then the vertical deflection plates for vertically deflecting electron beams are arranged. The vertical deflection plates may be electrostatic deflection plates (a pair of parallel planar electrodes), etc. usually used in an oscilloscope and so on. In the present embodiment, however, two planar electrodes $(D_{V1})$ 20 and $(D_{V2})$ 21 are used which are arranged at positions shifted in the direction of transmission of electron beams and which are provided with electron beam passing openings vertically shifted relative to each other. The operation of this embodiment is explained with reference to FIG. 10 which shows how the electron beams generated from the line cathodes 10 are vertically deflected. A portion of the flat type cathode ray tube shown in FIG. 9 is omitted in the side view of FIG. 10. Thermal electrons generated by heating the line cathodes 10 are extracted to form electron beams which are transmitted in the direction of the electrode (G3) 15 under the influence of the voltages applied to the vertical scan electrodes 12, line cathodes 10, electrodes (G1) 13 and electrode (G2) 14. An electric potential for causing thermal electrons to be emitted from the line cathodes 10 and to be transmitted toward the electrode (G1) 13 only for a period of n×1H is sequentially applied to the vertical scan electrodes 12 in the order of 12A, 12B, 12C, ... For example, assuming that electron beams are produced by the vertical scan electrode 12A (electron beams are not directly visible, but they are shown here as designated by 38A, 38B and 38C), the electron beams are modulated with a video signal, etc. applied to the electrode (G1) 13, and they pass through the openings of the electrodes (G2) 14 and (G3) 15, and then they are vertically deflected by the vertical deflection electrodes $(D_{V1})$ 20 and $(D_{V2})$ 21.

The openings disposed in the electrodes are arranged to be shifted from each other between the respective electrodes and to be vertically symmetrical with respect to the transmission paths of the electron beams, respectively. Deflection voltages such as sawtooth wave voltages are applied to the electrodes $(D_{V1})$ 20 and $(D_{V2})$ 21, whereby electron beams are sequentially deflected in the order of ①, ②, and ③, for example. Next, electron beams are generated from the vertical scan electrode 12B and the electron beams 38B produced by the vertical scan electrode 12B are sequentially deflected in the order of ④, ⑤ and ⑥. Then, the electron beams 38C produced by the vertical scan electrode 12C are sequentially deflected in the order of ⑦, ⑧, ... Thus, a similar operation is repeated until the bottom of the display screen is reached. Then, in an interlaced operation, the scanning of a second field is effected in a similar manner, as shown by ①', ②', ③', ..., but with the scanning line phase thereof shifted by 90 degrees from that of the first field. Thus, one frame scanning is completed. It is a matter of course that, when the scanning is shifted from the vertical scan electrode 12A to the vertical scan electrode 12B, a voltage for stopping the generation of electron beams is applied to the vertical scan electrode 12A, and a voltage for causing electron beams to be generated is applied to the vertical scan electrode 12B, and the above operation is repeated to scan the display screen.

In a noninterlaced system, the scanning operation may be effected in the order of ①, ①', ②, ②', ... Instead of the arrangement of the vertical deflection electrodes $(D_{V1})$ 20 and $(D_{V2})$ 21 described above, a pair of deflection electrodes may be arranged on both sides of each of the electron beam transmission paths.

Returning to FIG. 9, the vertically deflected electron beams are then horizontally deflected by the horizontal deflection electrodes $(D_{H1})$ 22, $(D_{H2})$ 23 and $(D_{H3})$ 24 formed by conductive films disposed on the insulating support 28 arranged on both sides of each of the electron beams. The deflection voltages having the same waveform superimposed on different DC center voltages are applied to the horizontal deflection electrodes $D_{H1}$, $D_{H2}$ and $D_{H3}$ so that the horizontal focusing of electron beams and the horizontal deflection with its deflection width determined by the spatial interval pitch of the line cathodes 10 are effected. The horizontal deflection electrodes 22, 23 and 24 are divided in the direction of the electron beam transmission paths so as to raise the deflection sensitivity, although only a pair of electrodes may be used. The horizontally deflected electron beam irradiates a light emitting layer comprising a phosphor screen 7 and a metal back layer 8 which light emitting layer is formed on an inner surface of the faceplate 9 and emits light upon irradiation thereof by the electron beams. In a monochromatic display, the light emitting layer may be a uniformly formed monochromatic phosphor layer, and, in a color display, it may comprise red, blue and green phosphor stripes or dots horizontally arranged at predetermined regular horizontal spatial intervals. In the color display, a predetermined modulation signal is applied to the electrode (G1) 13 at a predetermined phosphor position upon the horizontal deflection of the electron beams so that an image, characters, etc. may be displayed with high color reproducibility on the display screen.

In FIG. 9, a part of the light emitting layer is made bare with the faceplate 9 partially broken. In this system, each electron beam scans each block corresponding to each one of the line cathodes 10 and each one of the vertical scan electrodes 12, the blocks being shown by broken lines in FIG. 9. Then, all of the displays by the blocks are combined together on the display screen. Thus, a high quality image can be displayed with the thin structure.

In another modified embodiment, the vertical scan electrodes 12 behind the line cathodes 10 are arranged between the line cathodes 10 and the faceplate 9, and the electrodes (G1) 13 are arranged behind the line cathodes 10. In this case, however, it is necessary to provide electron beam openings in the respective vertical scan electrodes similarly to those of the electrodes (G1) 13 in the previous embodiment. In the above embodiment, the line cathodes 10 are horizontally divided and extend vertically, however, they need not be line cathodes but they may have a coiled shape, or the line cathodes may extend horizontally and may be arranged at positions corresponding to the vertical scan lines.

The present invention is also applicable to a flat type cathode ray tube of the structure which is different from that of the above-described embodiments in the spatial intervals between the electrodes, the position of the electrodes, etc.

With the above-described arrangement, the number of the vertical scan electrodes arranged behind the line cathodes can be reduced to 1/n of that of a prior art flat type cathode ray tube, so that the connection of the vertical scan electrodes with the associated circuits and the number of the drive circuits can be reduced. Further, since the vertical deflection is effected for every electron beam and the display of an image can be formed by the composition of the respective blocks on the display screen, a high quality image can be displayed on a flat type caghode ray tube. In addition, since the spatial interval between the vertical scan electrodes can be made greater than that of the prior art tube, appropriate supports for the line cathodes may be provided between the vertical scan electrodes, so that variations in the quantity of the electron beam emission caused by mechanical vibrations of the line cathodes may be prevented and a stable image may be obtained.

Figure 11:
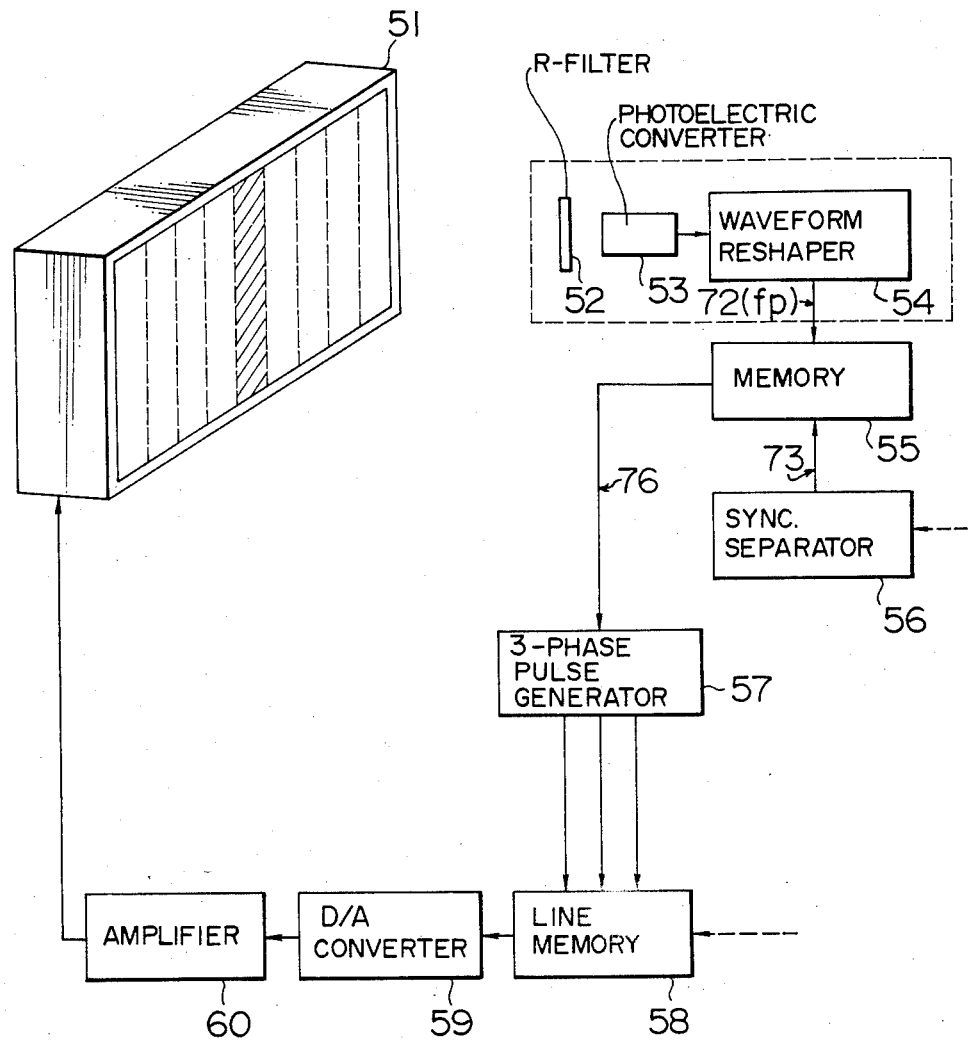
FIG. 11 is a block diagram showing a drive circuit for a third embodiment of the flat type cathode ray tube of the present invention.
Figure 12:
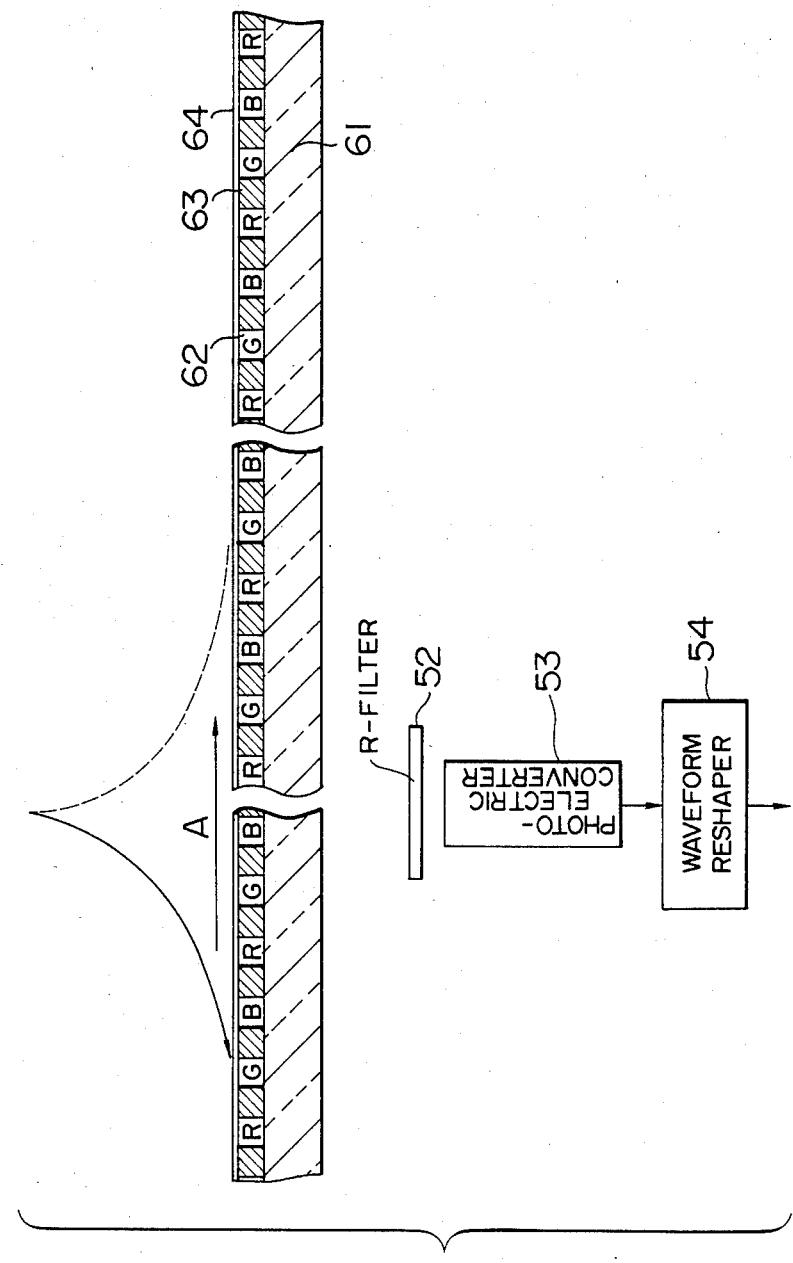
FIGS. 12 and 13 are respectively a partial enlarged view of the drive circuit shown in FIG. 11 and a waveform diagram showing the operational signal waveforms appearing in the drive circuit shown in FIG. 11.
Figure 13:
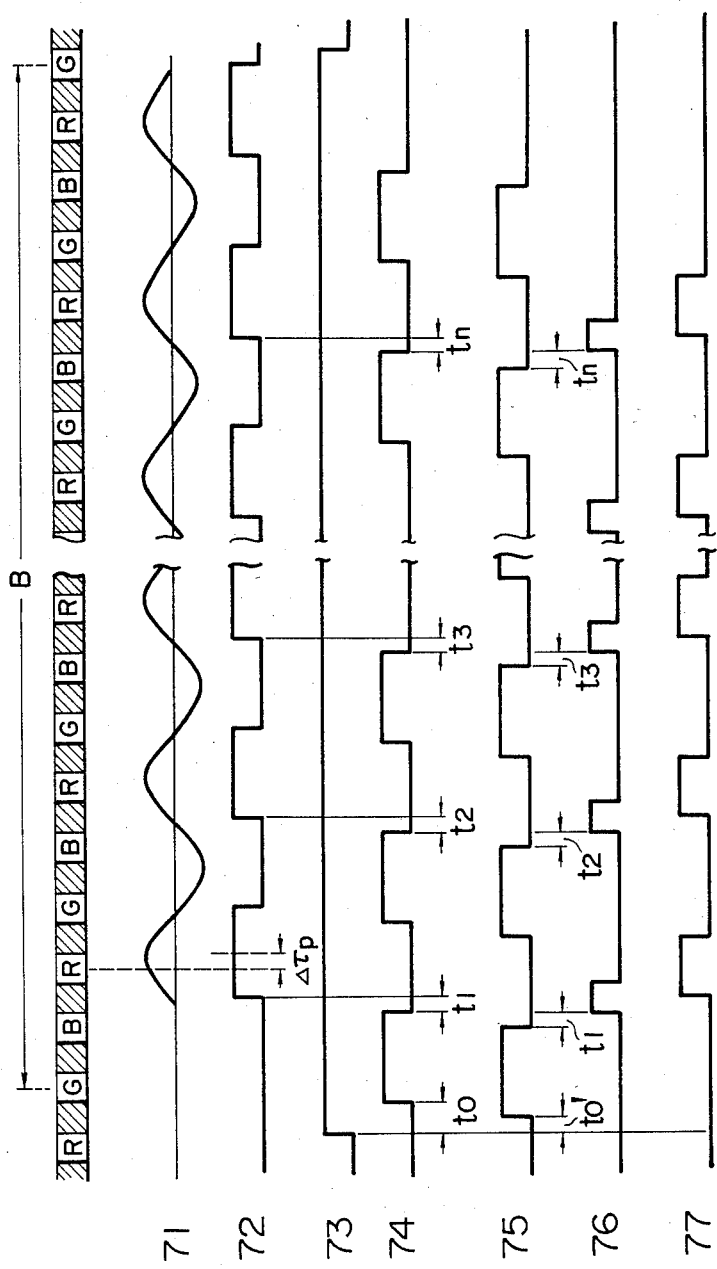

FIG. 11 shows a method according to a third embodiment of this invention for correcting the horizontal electron beam landing in the flat type cathode ray tube described above. Numeral 51 designates a complete assembly of a flat type cathode ray tube. The internal electrodes are the same as those described above. Voltages are applied to the electrodes so that only a hatched one of a plurality of horizontal blocks of the flat type cathode ray tube 51 shown by the broken lines is scanned by the electron beam. FIG. 12 shows an enlarged horizontal sectional view of the phosphor screen. The phosphor screen comprises phosphor stripes 62 of three primary colors R, G and B horizontally and repeatedly formed on the inner surface of the vacuum enclosure of a transparent glass plate 61, with light shielding black stripes 63 intervening between the phosphor stripes 62. A metal back electrode 64 made of aluminum or the like is formed thereon. It is assumed that the number of trios (a trio designates a set of R, G and B phosphor stripes) contained in one horizontal block is equal to m and the horizontal scanning is effected in the order of R→G→B→R ... G→B as shown by the arrow A in FIG. 12. The horizòntal deflection amplitude is made slightly greater so that the horizontal scanning is started from a position on an adjacent horizontal block which, however, does not allow any R phosphor stripe in the adjacent horizontal block to be scanned. A light beam emitted from the phosphor screen when it is scanned is sensed by a photoelectric conversion element 53 such as a photodiode or the like through a filter 52 which passes only a light beam from an R phosphor stripe so that a timing signal is produced when the electron beam scans the R phosphor stripe. This operation is illustrated in FIG. 13, in which the arrow B shows a horizontal scanning period, and numeral 71 designates a signal waveform having only a fundamental frequency component derived from an output signal from the photoelectric conversion element 53 through a band-pass filter. It is applied to a limiter to produce a signal waveform 72. The abovementioned band-pass filter and limiter are shown in FIG. 11 as a waveform reshaping circuit 54. Here, the signal 72 has a time delay $\Delta\tau_p$ from the instant of scanning the center of the phosphor stripe by the electron beam which is caused by the building-up characteristic of light emission by the phosphor and a delay characteristic of the waveform reshaping circuit. The signal 72 is supplied to a memory 55. The memory 55 generates a reference signal 74 which has a refrequency higher than the frequency $f_p$ of the output signal 72 from the waveform reshaping circuit 54 but lower than the value of $f_p + f_H$ (where $f_H$ is the horizontal scan frequency) and which is synchronized with a leading edge or trailing edge of a horizontal synchronization pulse 73 generated by a synchronizing separator circuit 56 or a horizontal blanking pulse 73 generated based on the horizontal synchronization pulse, measures the times $t_1, t_2, t_3, \ldots, t_n$ from the fall or rise of the reference signal 74 to the rise or fall of the input signal 72 thereto, and stores them. In view of the capacity of the memory and the later-described phase compensation, the adjustment is made of the time $t_o$ from the rise of the horizontal synchronization pulse 73 to the start of the reference signal 74. It is needless to say that the signals associated with respective horizontal scanning operations are stored in the memory 55 in synchronism with the vertical scanning operation. In this manner, the R timing signal generated by the horizontal scanning of one horizontal block by each electron beam can be stored.

The above operation is applied to the other horizontal blocks to store the R timing signals for the electron beams to scan the R phosphors on the entire display screen of the flat type cathode ray tube. The memory elements used in the memory 55 are of the nonvolatile type.

When the above operation is completed for the entire display screen, the elements in the block shown by a broken line in FIG. 11, that is, the filter 52, photoelectric conversion element 53 and waveform reshaping circuit 54 are removed. Then, the practical color image displaying operation is performed.

When displaying a color image on the flat type cathode ray tube 51, the stored signals which correspond to the horizontal scanning positions on the respective horizontal blocks are read out in parallel by the signal from the synchronizing separator circuit 56. Here, an explanation will be made with respect to only one horizontal block.

A read reference signal 75 having the same frequency as the reference signal 74 generated in writing the timing signals into the memory is generated in synchronism with the horizontal synchronization signal 73. The time $t_o'$ from the rise of the horizontal synchronization signal 73 to the start of the read reference signal 75 is made shorter than $t_o$, that is, $t_o' < t_o$. A signal 76 of a predetermined duration is generated the time $t_1, t_2, \ldots t_n$ after the fall of the signal read reference 75, and it is supplied to a three-phase pulse generator 57. The reason why the start time $t_o'$ of the read reference signal 75 is made shorter than $t_o$ is to compensate for a delay time occurring in the signal processing circuit from the reading of the timing signals from the memory to the application of the modulation signals to the modulation electrodes of the flat type cathode ray tube 51. The three-phase pulse generator 57 generates threephase pulse signals which have the same frequency as that of the input signal 72 to the memory 55 and have a phase difference of 120° from each other. These signals are used as read signals for a line memory 58 which corresponds to the second line memory 46 shown in FIG. 8 so that point sequential signals in the order of R→G→B→R→ . . . are produced. The signal from the line memory 58 is supplied to a D/A converter 59 (or a pulse width modulator), where it is converted to an analog signal which is supplied to an amplifier 60, the output of which is applied to the modulation electrode of the flat type cathode ray tube 51. As an example, a signal applied to the modulation electrode for displaying only the color R is shown by 77 in FIG. 13.

As described with respect to the above embodiment, the predetermined voltages are applied to the complete assembly of a flat type cathode ray tube to scan the phosphor screen by the electron beams, and the timings at which the electron beams scan the R, G and B phosphors are detected and stored. When displaying a practical color image, the stored timing signals are read out, and the color video signal to be applied to the flat type cathode ray tube is controlled based on the timing signals in correspondence with the electron beam positions on the phosphor screen thereby to effect color image display.

Figure 14A:
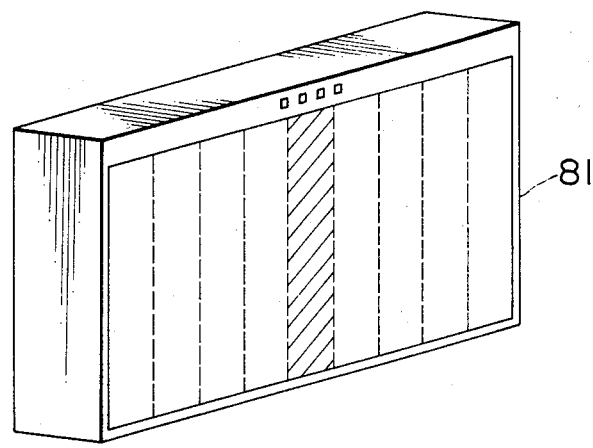
FIGS. 14A and 14B are respectively a perspective view and an internal front view of a fourth embodiment of the flat type cathode ray tube of the present invention.
Figure 14B:
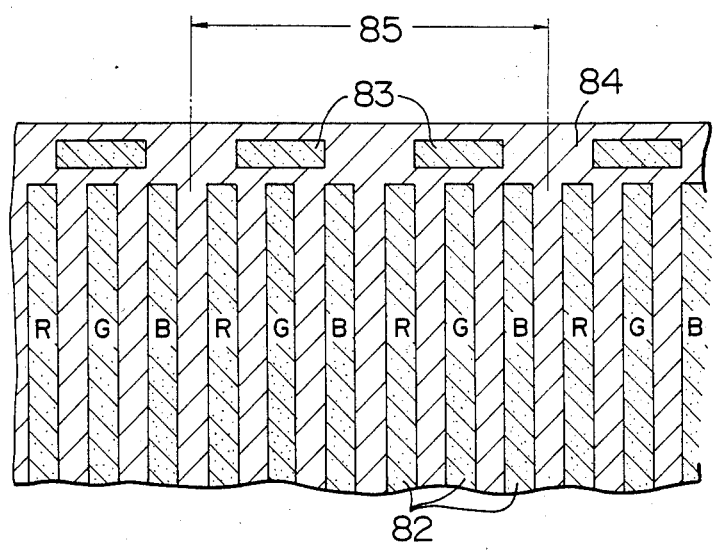

FIGS. 14A and 14B shows a flat type cathode ray tube according to a fourth embodiment of this invention. FIG. 14A shows an external appearance of the flat type cathode ray tube and FIG. 14B shows a front enlarged view of an essential portion thereof. In the color image display area thereof, phosphor stripes 82 of the three primary colors R, G and B are formed horizontally and sequentially with black stripes 84 intervening therebetween in the same manner as that shown in FIG. 11. In addition, Index phosphors 83 are disposed in the area other than the effective color image display area. It is necessary to provide index phosphors for at least one horizontal block, and the number of index phosphors for one horizontal block is not smaller than the number of trios of the color phosphor stripes in one horizontal block. In FIG. 14B, two trios of color phosphor stripes 82 are contained in one horizontal block 85, and four index phosphors 83 are disposed at the positions of G phosphors. Each of the index phosphors 83 may be formed by either one of R, G and B phosphors, alternatively, it may be a phosphor such as the near ultraviolet phosphor P-16 having a different light wavelength from those of the R, B and G phosphors.

Figure 15:
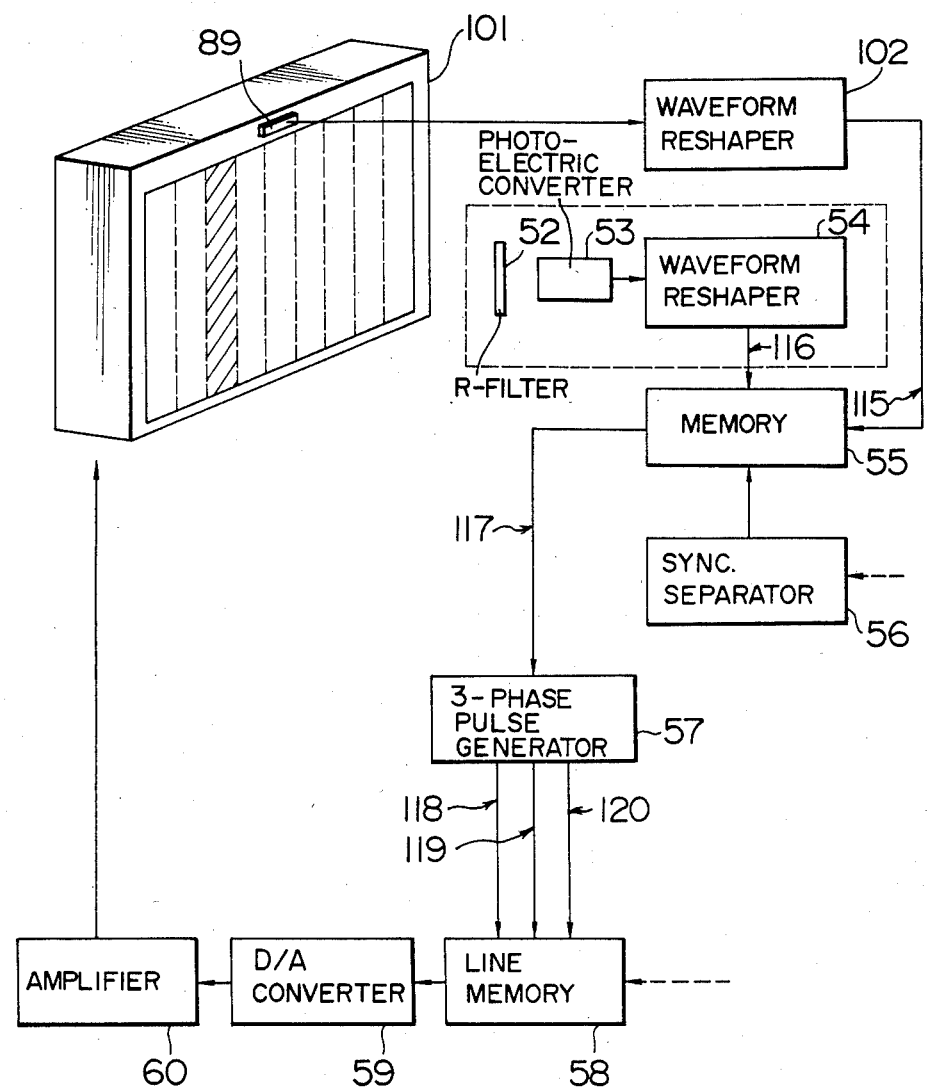
FIG. 15 is a block diagram showing a drive circuit for the flat type cathode ray tube shown in FIGS. 14A and 14B.
Figure 16:
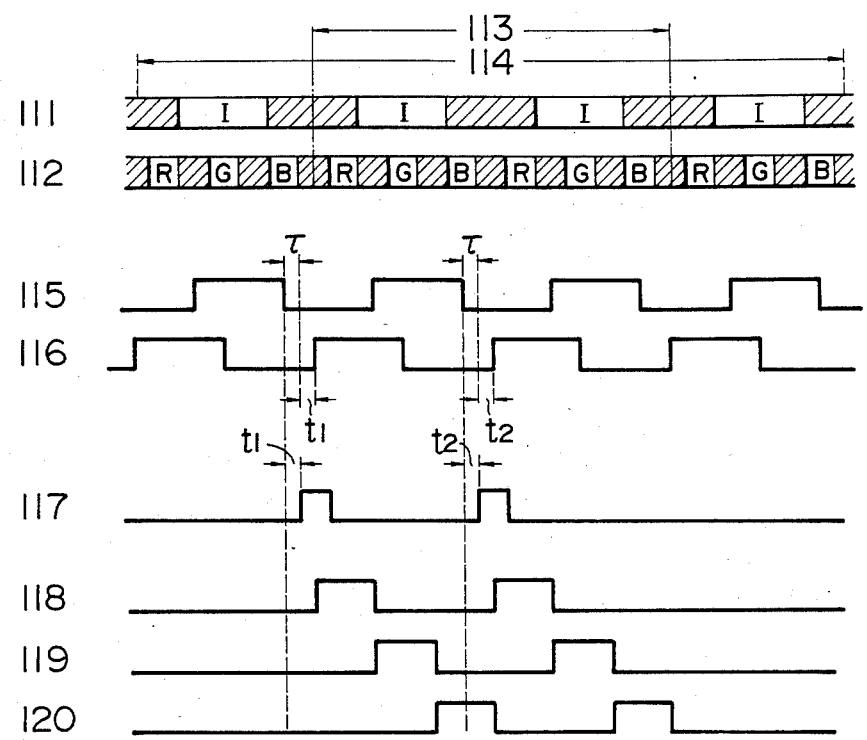
FIG. 16 is a waveform diagram showing the signal waveforms appearing in the drive circuit show in FIG. 15.

The method for driving the above flat type cathode ray tube 81 is explained. FIG. 15 shows the essentials of the drive circuit, and FIG. 16 shows signal waveforms. The same or like elements as those shown in FIG. 11 are designated by the same numerals.

The operation of this embodiment is basically identical with that of the previous embodiment. Only one of a plurality of horizontal blocks of the flat type cathode ray tube 101 is scanned by an electron beam. The index phosphors illustrated in FIGS. 14A and 14B are simultaneously scanned by the electron beam. FIG. 16 shows the relative positional relationship between the index phosphors 111 and the color display area 112 including the three primary color phosphors. Also in this embodiment, the electron beam is deflected at a span greater than the width 113 of one horizontal block as shown by 114. In FIG. 16, assuming that the electron beam scans the color phosphors of the color display area 112 from left to right, an output signal 116 is produced by the R filter 52, photoelectric converter 53 and waveform reshaping circuit 54. On the other hand, the index phosphors 111 are also scanned by the electron beam and a signal 115 is @@5 produced by the photoelectric converter 89 and waveform reshaping circuit 102. In this embodiment, the signal 115 is used as a reference signal. The times from the fall of the reference signal 115 to the rise of the signal 116 from the color display area, which are indicated by $(\tau+t_1)$ and $(\tau+t_2)$ in FIG. 16, may be stored in the memory 55, but in order to compensate for the delay time from the reading of the timing signals from the memory to the application of the modulation signals to the flat type cathode ray tube 101, the times $t_1$ and $t_2$ starting from a time point, which is delayed by $\tau$ from the fall of the reference signal 115 applied to the memory 55, to the rise of the signal 116 from the color display area are stored in the memory. This method is advantageous in reducing a required capacity of the memory.

The above-described writing of the signals into the memory 55 is performed for each horizontal block, so that the timing signals for the electron beam to scan the R phosphors on the entire phosphor screen may be stored by using the signal from the index phosphors as the reference signal. Accordingly, the index phosphors are constantly scanned by the electron beam, whichever of the horizontal blocks may be in operation.

The color image display operation is then started. In this case, the elements in the broken line block in FIG. 15 become unnecessary. The index phosphors 111 are constantly scanned by the electron beam and the reference signal 115 is produced through the waveform reshaping circuit 102, which signal is used as the read reference. Then, the signal 117 of a predetermined duration is generated after the times $t_1$ and $t_2$ has elapsed from the fall of the reference signal 115, and it is supplied to the three-phase pulse generator 57 thereby to generate the signals 118, 119 and 120 shown in FIG. 16. The subsequent operation of the signal processing circuit is the same as that of the embodiment shown in FIG. 11.

The above fourth embodiment differs from the third embodiment in the manners of writing into the memory and generating the read reference signal. In the third embodiment, the read reference signal is generated based on the horizontal synchronization signal, while, in the fourth emboidment, the read reference signal is generated by scanning the index phosphors disposed outside of the effective color image display area by the electron beam.

Figure 17:
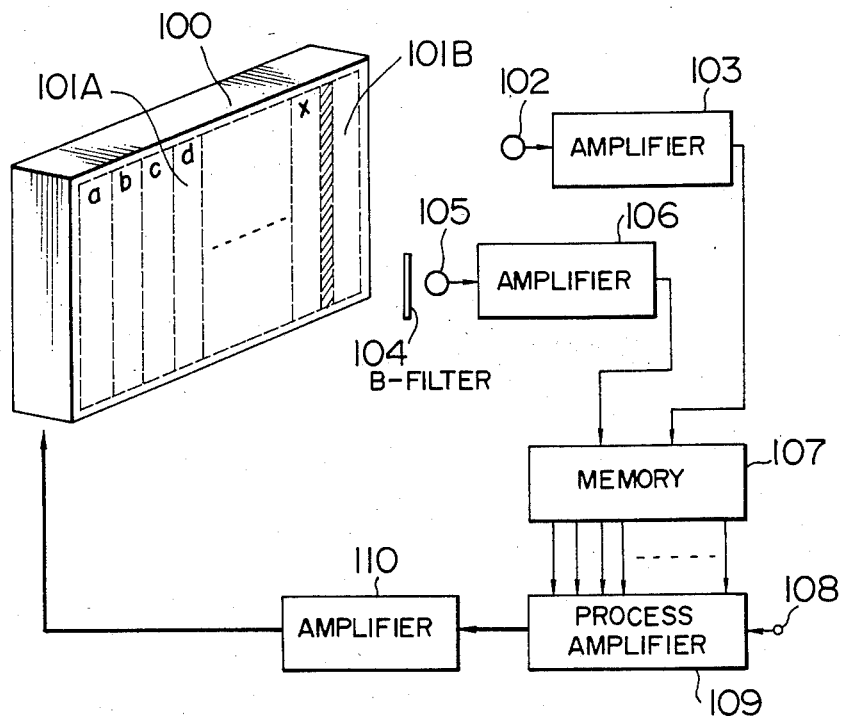
FIG. 17 is a block diagram showing the general arrangement of a color image display apparatus in accordance with a fifth embodiment of the present invention.
Figure 18:
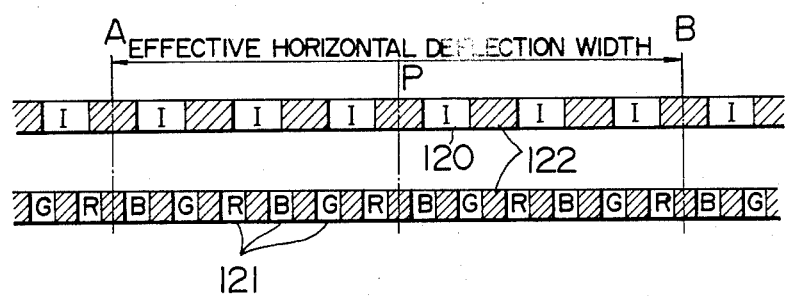
FIG. 18 is an enlarged view showing the phosphor screen of a flat type color cathode ray tube shown in FIG. 17.

FIG. 17 shows a fifth embodiment of this invention. Numeral 100 designates a flat type color cathode ray tube having an image display area 101A and an index area 101B. As shown in FIG. 18, index phosphors 120 are disposed, with black phosphors 122 intervening therebetween, at a pitch different from a repetition pitch (hereinafter referred to as "trio pitch") of R, G and B phosphor stripes 121 of the image display area 101A. (In FIG. 18, the index phosphor pitch is ⅜ times of the trio pitch.) The index phosphor 120 may be one of the R, G and B phosphors or a phosphor having a different wavelength from those of the R, G and B phosphors. In FIG. 18, P is a center axis of the electron beam and also a center of each horizontal block, and A and B show boundaries of an effective horizontal region of one horizontal block. That is, the span A-B shows an effective horizontal deflection width.

The index area 101B is always scanned by a constant D.C. beam, and the light beam emitted therefrom is detected by the photoelectric converter 102. The output therefrom is amplified through an amplifier 103 and is supplied to a memory 107.

On the other hand, only one horizontal block (e.g. block a) in the image display area 101A is always scanned by a constant D.C. beam, and the light beam generated thereby passes through a filter 104, which allows only a light beam having the wavelength of the B phosphor to pass therethrough, and is transmitted to a photoelectric converter 105. The output of the photoelectric converter 105 is amplified through an amplifier 106 and is supplied to the memory 107.

The operation of the memory 107 will be explained later in detail. Basically, the memory 107 stores, for example, a time difference between a reference signal obtained by scanning the index area 101B and a timing signal for the electron beam to soan the B phosphors in the image display area 101A. The similar storing operation by the memory 107 is performed on the other horizontal blocks in the image display area 101A. As a result, the memory 107 stores the timings for the electron beam to scan the B phosphors in the entire area of the image display area 101A of the flat type color cathode ray tube.

After the above operation has been completed, the circuit portion used for detecting the light beam from the B phosphors and supplying an input signal to the memory shown in FIG. 17 becomes unnecessary and is removed. Then, the practical color image displaying operation is started Here, the signals stored in the memory 107 are retained even when electric power supply is subsequently turned off. This is readily attained by using a nonvolatile memory.

Also, in the practical color image displaying operation, the index area 101B is constantly scanned by the electron beam, and the stored timing signals for the electron beams to scan the B phosphors of the horizontal blocks are read out from the memory 107 by using the signal produced by detecting the light beam from the index area 101B as a reference signal. The R, G and B video signals 108 are converted to a point sequential color signal through a process amplifier 109 in accordance with the signals read out from the memory 107, and the point sequential color signal is amplified through an amplifier 110 and is then applied to the corresponding modulation electrodes of the flat type color cathode ray tube 100. Here, it is a matter of course that the number of the signal processing circuits including the elements from the memory 107 to the modulation electrodes of the flat type cathode ray tube 100 should be equal to the number of the horizontal blocks in the image display area 101A.

Figure 19:
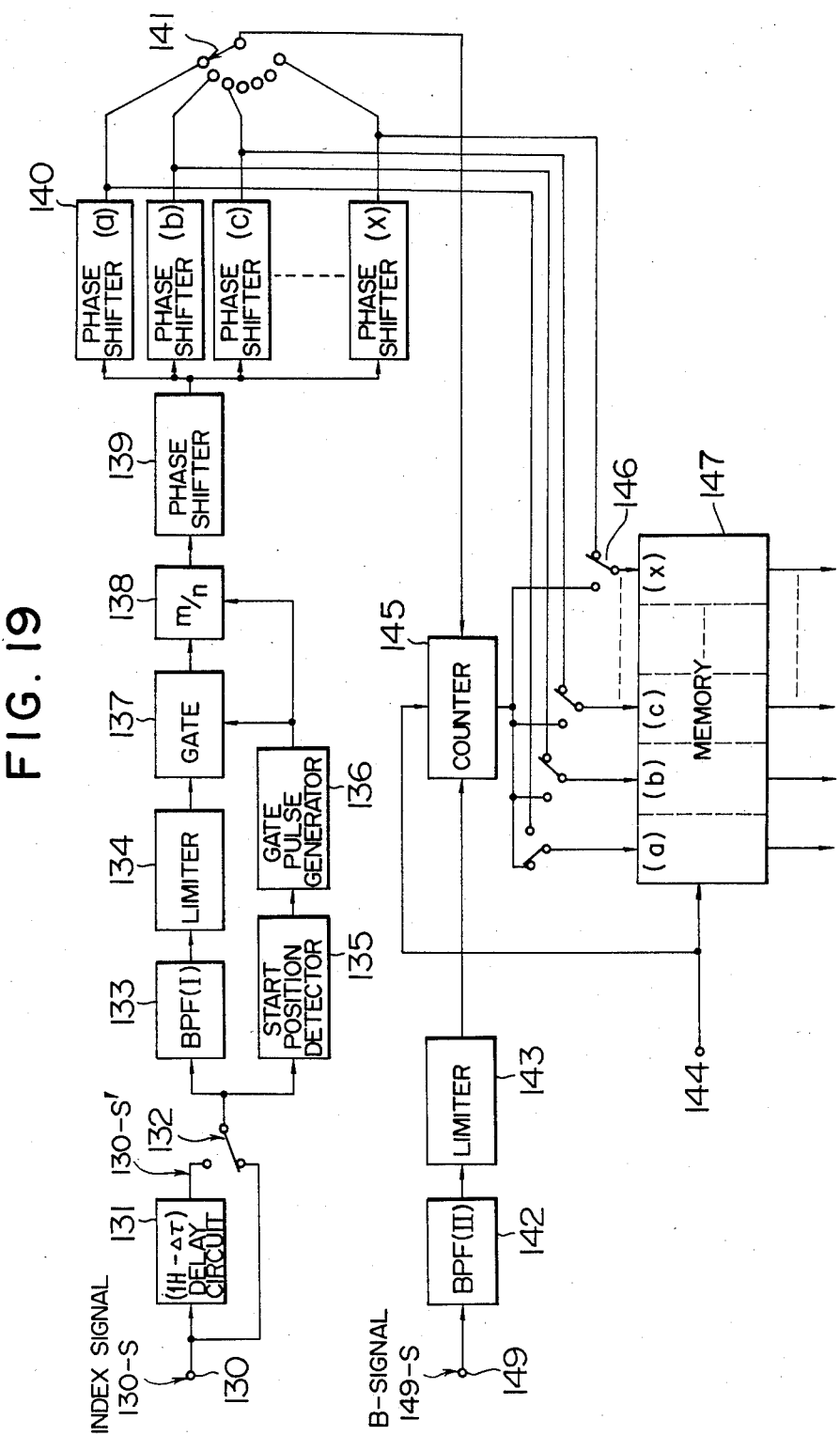
FIG. 19 is a block diagram showing the internal arrangement of the memory in the color image display apparatus shown in FIG. 17.
Figure 20:
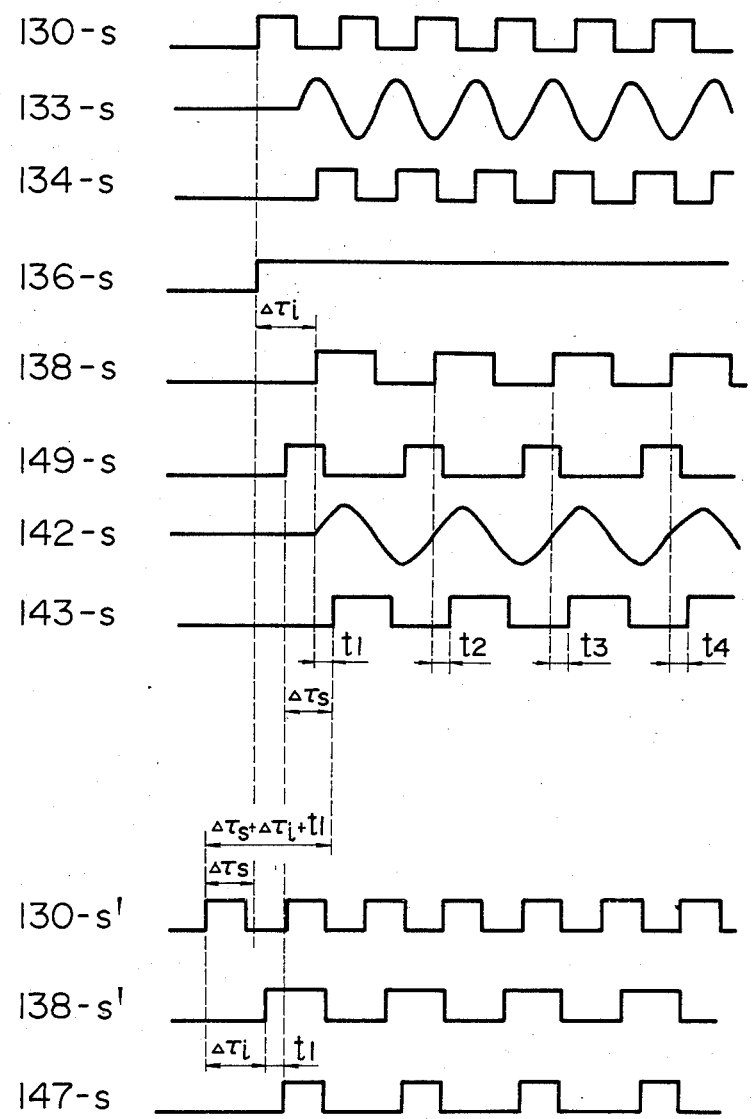
FIGS. 20 and 21 are waveform diagrams showing the waveforms of the output signals from the circuit blocks contained in the internal arrangement of the memory shown in FIG. 19.

The operation of the memory 107 is explained in detail with reference to FIGS. 19 and 20. Signal waveforms in FIG. 20 show output signals from elements in FIG. 19 and are designated by the same reference numerals designating the elements but with the symbol "S" added thereto.

The operation of writing the signals into the memory is first explained. A signal 130-S, which is derived from the index area and is supplied to an input end 130 (hereinafter referred to as "index signal"), passes through a switch 132 and is supplied to a band-pass filter (I) 133, which extracts a fundamental frequency component signal 133-S. The signal 133-S is supplied to a limiter 134 which reshapes it into a rectangular signal 134-S. In FIG. 20, the start point of the index signal 130-S is an origin point of the time axis. The time delay in the start point of the limiter output signal 134-S is caused by delay time characteristics of various circuits.

On the other hand, the index signal 130-S is supplied to a start position detection circuit 135 which detects the start position at every 1H period and causes a gate pulse generator 136 to generate a gate pulse signal 136-S having a duration of approximately 1H. The gate pulse signal 136-S is supplied to a gate circuit 137 and an m/n multiplier 138. The gate circuit 137 gates the output signal from the limiter 134 and the multiplier 138 multiplies the output signal from the gate circuit 137 by a factor of m/n. The output signal from the multiplier 138 is used as a phase reference signal. FIG. 20 shows a case where m=2 and n=3. The m/n multiplier 138 operates to make its output signal 138-S have the same frequency as that of the B signals 149-S. The output signal 138-S from the m/n multiplier 138 is supplied to a counter 145 through phase shifters 139 and 140 and a switch 141. The phase shifters 139 and 140 will be explained later. The switch 141 is switched to correspond to a horizontal block of the image display area which horizontal block is in operation at that time.

On the other hand, the timing signals (hereinafter referred to as "B signal") 149-S for the electron beam to scan the B phosphors in one horizontal block of the image display area are applied to a band-pass filter (II) 142 which allows the fundamental frequency component of the timing signals to pass therethrough, and the output signal from the band-pass filter (II) 142 is supplied to a limiter 143 to be reshaped thereby, and the reshaped output signal therefrom is supplied to the counter 145 to which high frequency clock signals 144 are applied. The counter 145 counts the number of the high frequency clock signals contained in the times $t_1$, $t_2$, ..., from the rise of the phase reference signal 138-S to the rise of the limiter output signal 143-S for the B signals by using the rise time point of the phase reference signal 138-S as the phase reference, and the counts are written into predetermined addresses of the memory 147 through a switch 146, which is interlinked with the switch 141.

In this manner, the timings for the electron beam to scan the B phosphors in one horizontal block are written into the memory based on the phase reference signal derived from the index signal. The above write operation is repeated for all horizontal blocks in the image display area.

Figure 21:
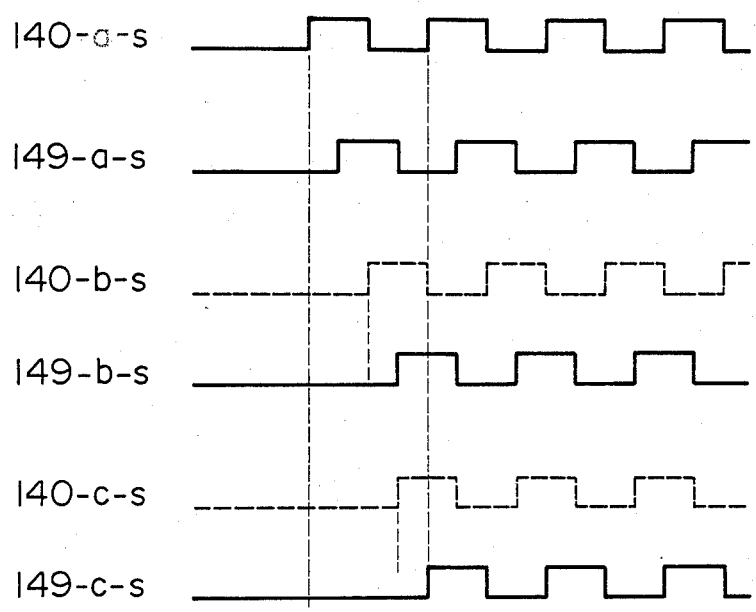

Since it is extremely difficult to assure high precision in the dimension of the electrodes of the flat type color cathode ray tube and in the assembling of the flat type color cathode ray tube, there occur variations in the timings at which the electron beams impinge upon the phosphors. Thus, as shown in FIG. 21, assuming that the phase reference signal obtained for one horizontal scanning is shown by 140-a-s and the B signals obtained from the horizontal blocks (a), (b) and (c) of the image display area based on the reference signal 140-a-s are shown by 149-a-s, 149-b-s and 149-c-s, the time durations from the rise of the phase reference signal 140-a-s to the rise of the respective B signals differ and some of them may exceed one period. As described above, when the time period under measurement is long, erroneous measurement may occur due to noise, and if the time duration becomes close to one period, it overlaps with the address switching in the memory or the start of the time measuring operation for a next period, so that errors are apt to occur in the operation of the memory. This problem may be solved by adjusting the phase reference signal 140S to the phases of the B signals, namely, by adjusting the phase shifters 140 to obtain the signals 140-a-s, 140-b-s and 140-c-s, ..., which provide substantially the same measurement time durations, respectively. The phase shifter 139 is used for coarse adjustment and it may be omitted in some cases.

When the write operation has been completed, the memory 147 is switched to the read-only mode, and the output signals from the phase shifters 140 are supplied to the memory 147. The index area is constantly scanned by the electron beam also in this case to produce the index signal.

In the read mode, the index signal 130-S is delayed by the time $(1H - \Delta\tau)$ through the delay circuit 131, and the output signal 130-S' therefrom is supplied to the band-pass filter (I) 133 and the start position detection circuit 135. As described above, as each of the index signal 130-S and the B signals 149-S passes through a required circuit system, a delay will occur between input and output signals therefor. Thus, if the timing signals are read out from the memory 147 by using the phase reference signal 138-S derived from the same index signal as that used in writing the timing signals into the memory 147, a signal corresponding to 143-S is read out, as shown in FIG. 20. This signal is delayed by $\Delta\tau_S$ from the phase of the proper B signal 149-S. If the electron beam is modulated by using this signal, the electron beam will not be directed to correct color phosphors. The time $\Delta\tau_S$ represents a delay time which is caused when the B signal 149-S passes through the band-pass filter 142 and the limiter 143. Accordingly, it is necessary to advance the phase of the read phase reference signal by $\Delta\tau_S$. If such a read phase reference signal 138-S' of the advanced phase is used, the output signal 147-S is obtained, which is in phase with the proper B signal 149-S generated in the image display area. Actually, the phase of the read phase reference signal is advanced by a delay time $\Delta\tau$ $(=\Delta\tau_S+\Delta\tau_T)$ which includes additionally a total delay time $\Delta\tau_T$ occurring in the signal processing circuit from the reading from the memory 147 to the application to the modulation electrodes of the flat type color cathode ray tube. A practical step for advancing the phase by the delay time $\Delta\tau$ may be attained by delaying the index signal by the time (1H - $\Delta\tau$), based on the fact that, since each of the horizontal deflection electrodes 22, 23 and 24 of the above-described flat type color cathode ray tube has no discontinuous portion in the vertical direction and is constructed to have a uniform shape, a high degree of correlation exists between the phases of the index signals for the adjacent scan lines of the flat type color cathode ray tube. Therefore, by delaying the index signal by the time (1H − $\Delta\tau$) and by processing the index signal in the same way as the write operation, it is possible to obtain the phase reference signal 138-S' whose phase has been advanced by the time $\Delta\tau$.

The signals read out from the memory 147 are supplied to a similar signal processing circuit to that described with reference to FIG. 17.

What is claimed is:

1. A flat type cathode ray tube comprising:
    a plurality of vertically extending line cathodes arranged horizontally substantially in parallel with an image display area in a vacuum enclosure;
    as many electrically divided vertical scan electrodes as 1/n (where n is an integer not smaller than 2) of the number of horizontal scan lines, arranged behind said line cathodes perpendicularly to said line cathodes; and
    electron beam control electrodes, planar grid electrodes, vertical deflection electrodes and horizontal deflection electrodes each thereof comprising a group of electrodes which are arranged in the direction of electron beam transmission paths, said four kinds of electrodes being sequentially arranged between said line cathodes and said image display area toward said image display area.

2. A flat type cathode ray ,tube according to claim 1, wherein said electron beam control electrodes are arranged in one-to-one correspondence with said respective line cathodes and each of said electron beam control electrodes has electron beam passing openings at portions thereof corresponding to said vertical scan electrodes.

3. A flat type cathode ray tube according to claim 1, wherein said vertical deflection electrodes include two planar electrodes respectively having electron beam passing openings therein positioned to be shifted from each other between said two planar electrodes.

4. A flat type cathode ray tube according to claim I, wherein said planar grid electrodes include three planar electrodes ⓔach therⓔof having electron beam passing openings at portions thereof corresponding to said vertical scan electrodes.

5. A flat type cathode ray tube according to claim 1, wherein said horizontal deflection electrodes comprise three respective groups of electrodes.

6. A flat type cathode ray tube according to claim 1, wherein said horizontal deflection electrodes are provided at positions corresponding to horizontal mid-positions of said plurality of line cathodes and connected alternately to common buses.

7. A color image display apparatus comprising:
    a flat type cathode ray tube including an image display area having a plurality of hroizontal blocks of image display area arranged horizontally, each horizontal block comprising a phosphor screen having color phosphors of at least three primary colors red, green and blue sequentially and repeatedly arranged in the horizontal direction with black areas intervening therebetween, a plurality of electron beam sources, and means for scanning each of said horizontal blocks of said image display area by each electron beam from each of said electron beam sources;
    means for storing signals each of which represents a phase difference between a reference signal and a timing signal for each electron beam to scan a predetermined color phosphor on the phosphor screen of said flat type cathode ray tube; and
    means for reading out the stored signals to control color video signals to be applied to said flat type cathode ray tube to make each electron beam, which scans each of said horizontal blocks of image display area, corespond to proper positions on the phosphor screen in accordance with the reference signal, thereby effecting color image display.

8. A color image display apparatus according to claim 7, wherein said reference signal has a frequency higher than a fundamental frequency of the timing signal, with a difference between the frequency of said reference signal and the fundamental frequency of the timing signal being lower than a horizontal scanning frequency, and said reference signal is generated based on a television synchronization signal.

9. A color image display apparatus according to claim 7, wherein the phase of said reference signal is adjustable to compensate a delay time caused by associated drive circuits.

10. A color image display apparatus according to claim 7, wherein said reference signal is generated by reference signal generating means which comprises:
    index phosphors disposed outside of an effective image display area; and
    means for scanning said index phosphors by an electron beam in synchronism with and independently of the electron beam scanning of the effective image display area and receiving a light beam from said index phosphors through a photoelectric conversion element.

11. A color image display apparatus comprising:

a flat type cathode ray tube including an image display area having a plurality of horizontal blocks of image display area arranged horizontally, each horizontal block comprising a phosphor screen having color phosphors of at least three primary colors, red, green and blue sequentially and repeatedly arranged in the horizontal direction with black areas intervening therebetween, an index area disposed outside of said image display area, and means for scanning said image display area and said index area by electron beams;

means for scanning said index area by an electron beam in synchronism with and independently of the electron beam scanning of the image display area to produce an index signal for providing a phase reference signal;

means for detecting the timing for the electron beam to scan the color phosphors in the image display area and producing a timing signal, adjusting the phase of said phase reference signal for each horizontal block, measuring a phase difference between the phase reference signal and the timing signal and storing the phase difference in a nonvolatile memory;

means for reading the phase difference signal from said memory in accordance with the phase reference signal to reproduce the timing signal for the electron beam to scan the color phosphors; and means for controlling a color video signal to be applied to the flat type cathode ray tube in accordance with the reproduced timing signal, thereby effecting color image display.

12. A color image display apparatus according to claim 11, wherein an index signal start point is detected in synchronism with a horizontal synchronization signal, a gate pulse having a duration close to one horizontal scan period (1H) is produced based on the detected index signal start point, a reshaped index signal is extracted by the gate pulse, and a phase reference signal generation circuit is controlled by the gate pulse simultaneously.

13. A color image display apparatus according to claim 11, wherein the index signal is delayed by a time $(1H - \tau)$, where $\tau$ is a total delay time of the timing signal, which timing signal is generated by scanning the color phosphors in the image display area by the electron beam, and which delay time occurs while the timing signal passes associated signal processing circuits and is fed back to modulation means of the flat type color cathode ray tube, 14. A color image display apparatus according to claim 11, wherein said index area comprises a plurality of index regions disposed outside of said image display area, at least one of which indexed regions is disposed outside of at least one odd-numbered horizontal block of said plurality of horizontal blocks of image display area and at least one of which is disposed outside of at least one even-numbered horizontal block of said plurality of horizontal blocks of image display area.

* * * * *